Oct. 28, 1924.  
R. R. BOWERS  
HAY PRESS  
Filed July 3, 1922  
1,513,579  
3 Sheets-Sheet 2

Witness;  
E. Wilderson

Inventor;  
Robert R. Bowers,  
by Adams & Jackson  
Attorneys.

Oct. 28, 1924.

R. R. BOWERS

HAY PRESS

Filed July 3, 1922

Witness:
E. Wilderson

Inventor:
Robert R. Bowers,
by Adams & Jackson.
Attorneys.

Patented Oct. 28, 1924.

1,513,579

UNITED STATES PATENT OFFICE.

ROBERT R. BOWERS, OF OTTUMWA, IOWA, ASSIGNOR TO DAIN MANUFACTURING COMPANY OF IOWA, OF OTTUMWA, IOWA, A CORPORATION OF IOWA.

HAY PRESS.

Application filed July 3, 1922. Serial No. 572,543.

*To all whom it may concern:*

Be it known that I, ROBERT R. BOWERS, a citizen of the United States, and a resident of Ottumwa, in the county of Wapello and State of Iowa, have invented certain new and useful Improvements in Hay Presses, of which the following is a specification, reference being had to the accompanying drawings.

My invention relates to hay presses, and has particularly to do with the devices for controlling the position of the usual feeder. As is well known to those familiar with the art, such feeders are usually provided with relief mechanism which will permit the feeder arm to yield when the feeder head carried thereby encounters some solid object or an unusually large charge of hay which cannot be forced into the baling chamber, thereby avoiding the danger of breakage. Such relief mechanism usually comprises one or more springs which operate to hold the head against normal resistance and yield under unusual stresses encountered by the feeder head, but so far as I am aware, in all prior constructions the pressure at the feeder head is directly proportional to the degree of compression, or elongation, of the relief spring or springs. This is disadvantageous because when the feeder head encounters extraordinary resistance it causes a severe strain on the feeder arm mechanism, and as the power required is necessarily directly proportional to the pressure delivered at the feeder head, considerable power is wasted. The object of my invention is to avoid these objections, and to provide improved means for holding the feeder arm normally in operative position which will permit it to yield to unusual resistance without imposing undue strain on the feeder arm mechanism, and without appreciable loss of power. I accomplish this object as illustrated in the drawings and as hereinafter described. What I regard as new is set forth in the claims.

In the accompanying drawings, in which I have illustrated my improvements applied to a hay press of the general type shown and described in Letters Patent No. 1,205,163, granted November 21, 1916, to Joseph Dain,—

Fig. 2 is an enlarged partial side elevation showing the feeder arm, operating mechanism, and the controlling devices for the feeder arm in their normal relation to each other;

Fig. 3 is a perspective view of a bracket which forms part of the adjusting mechanism for determining the normal tension of the relief spring;

As my present invention relates only to the mechanism for operating and controlling the position of the feeder arm and head, it is not believed to be necessary to describe in detail the other parts of the hay press illustrated, as my improvements may be applied to any hay press to which they are adapted. It will be sufficient, therefore, to say that in the machine illustrated in Fig. 1, 7 indicates the usual baling chamber, 8 the compression chamber, 9 the pitman by which the usual plunger is operated, and 10 a pair of bull gears driven from any suitable source of power. In the construction shown in Fig. 1 they are driven from a shaft 11 provided with fast and loose pulleys 12, 13 through which the shaft may be driven from a steam or gasoline engine. The shaft 11 is, of course, connected with the bull gears 10 by suitable intermediate gearing shown in Fig. 1, but which need not be particularly described.

Figure 1:
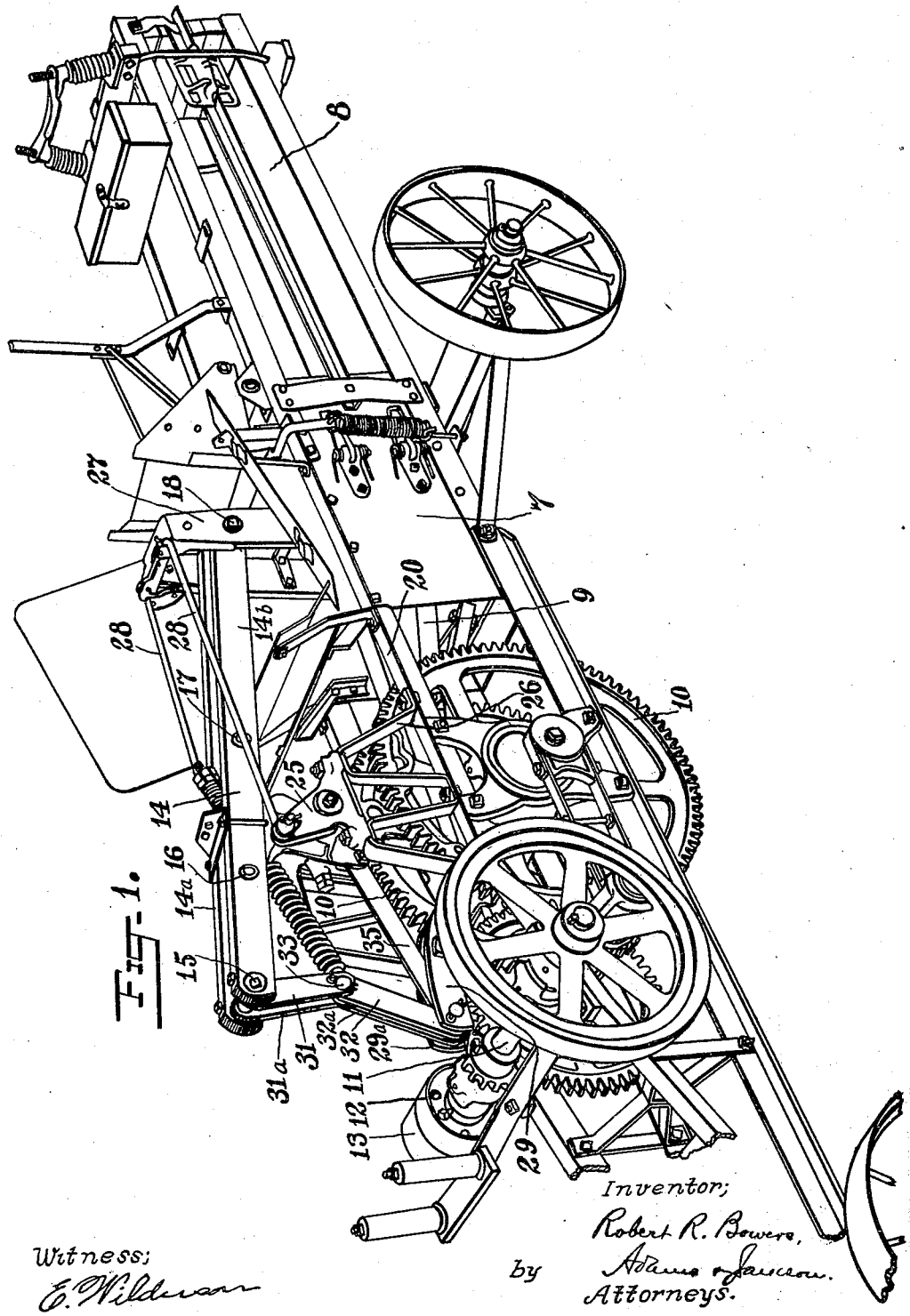
Fig. 1 is a perspective view showing the principal parts of a hay press having my improvements applied thereto.
Figure 4:
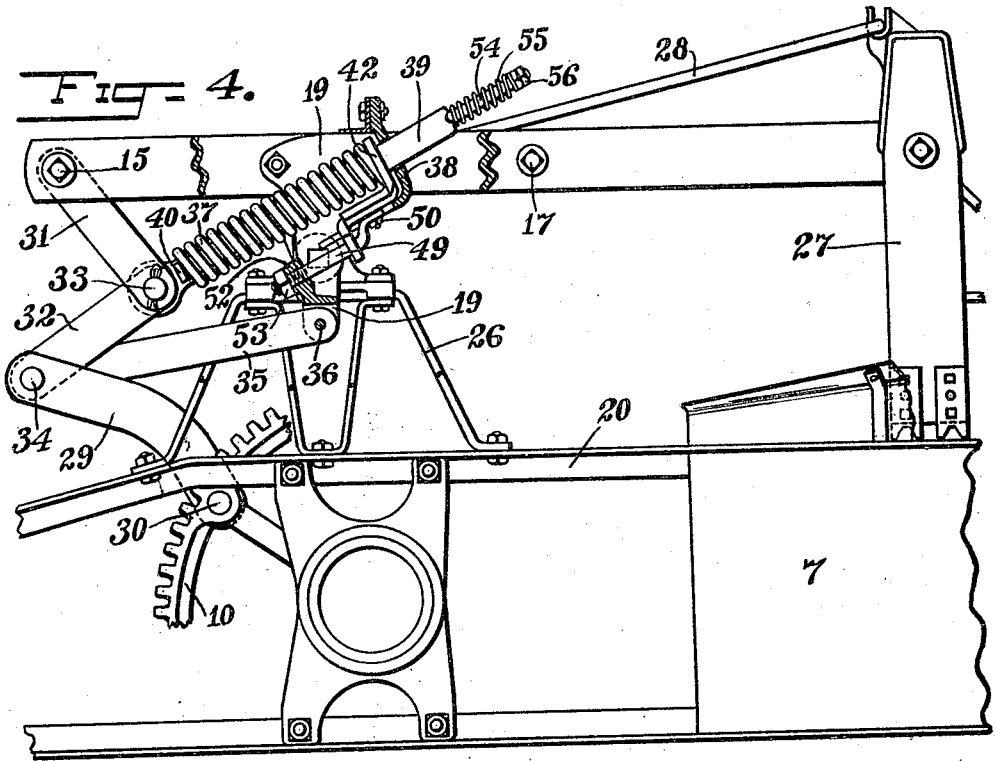
Fig. 4 is a view similar to Fig. 2, showing the position of the relief mechanism when the feeder head has encountered extraordinary resistance, some parts being in section.
Figures 5, 6:
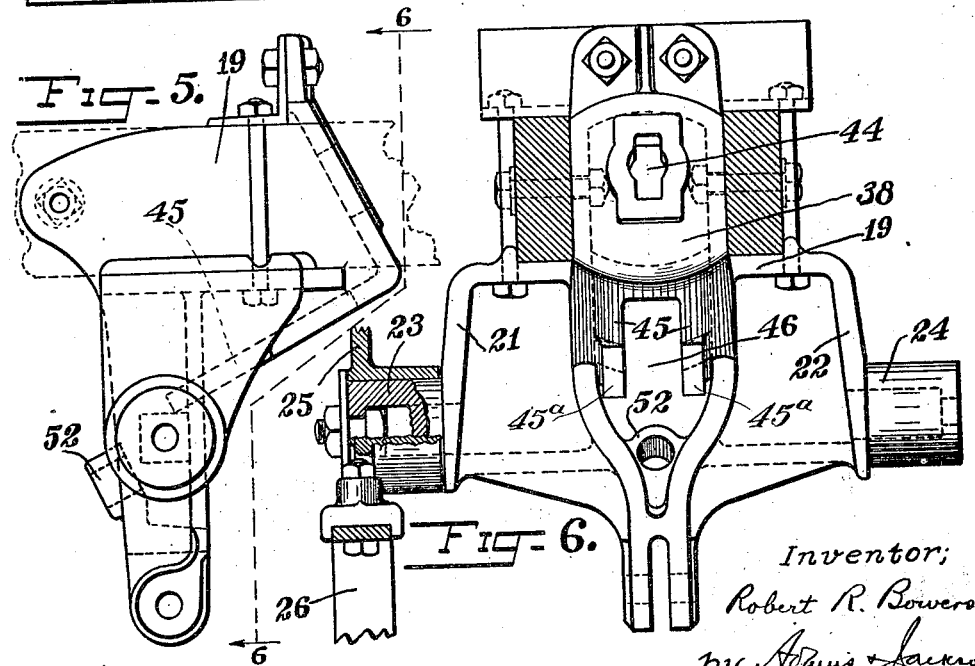
Fig. 5 is a detail, being a side elevation of the casting upon which the feeder arm is mounted.
Fig. 6 is a vertical cross-section on line 6—6 of Fig. 5 looking to the left.

14 indicates the feeder arm, which is usually made of two parallel members 14ª, 14ᵇ spaced a short distance apart and connected together by bolts 15, 16, 17, 18. They are also connected together by an interposed casting 19, as shown in Figs. 5 and 6, which serves also as a means of pivotally mounting the feeder arm upon the frame 20 of the press. To this end the casting 19, as shown in Fig. 6, is provided with downwardly extending arms 21, 22 which carry trunnions 23, 24 arranged to be fitted in suitable bearings carried by brackets 25 mounted at opposite sides of the press on standards 26 secured to the frame 20, as shown in Figs. 1 and 4. The casting 19 is secured to the feeder arm members a short distance back of the longitudinal center thereof, so that that portion of the feeder arm next to the baling chamber of the press is somewhat longer than the other. The longer portion of the feeder arm carries a feeder head 27 pivoted on the bolt 18, and arranged to be moved into and out of the baling chamber by the rocking of the feeder arm to thrust the charges of hay down into said chamber in the usual way. The feeder head 27 has a rocking movement with respect to the feeder arm, its position being controlled by links 28 connected with the upper end portion of the feeder head and with the brackets 25, as is common in machines of this type.

The opposite or rear end of the feeder arm is operatively connected with the bull gears by means of an operating arm, preferably composed of two similar members 29, 29ª spaced a short distance apart. This operating arm is connected at its lower end by a pivot 30 with a peripheral portion of the bull gears 10, and at its upper end is connected with the rear end of the feeder arm by a compression member of members normally held at a pronounced angle to the feeder arm, as by the spring hereinafter described, but adapted to swing to a less angular position when the feeder arm encounters abnormal resistance, thereby permitting the feeder arm to yield to accommodate itself to such resistance. In the construction illustrated the compression member is in the form of a toggle comprising upper members 31, 31ª and lower members 32, 32ª. The upper and lower members of the toggle are connected together by a pivot 33. The upper members 31, 31ª are connected with the feeder arm by the bolt 15, and the lower members 32, 32ª are connected with the upper end of the operating arm members 29, 29ª by a pivot 34. It will be understood that while I prefer to make the parts of the toggle each of two members, this is not essential, and neither is it essential that the operating arm or the feeder arm be made each of two members, but the construction shown is preferable. The position of the upper end of the operating arm 29 is controlled by a link 35, the rear end of which is connected with the pivot 34 while its forward end is connected by a pivot 36 with the lower end portion of the casting 19, as shown in Figs. 2 and 4.

Figures 2, 3:
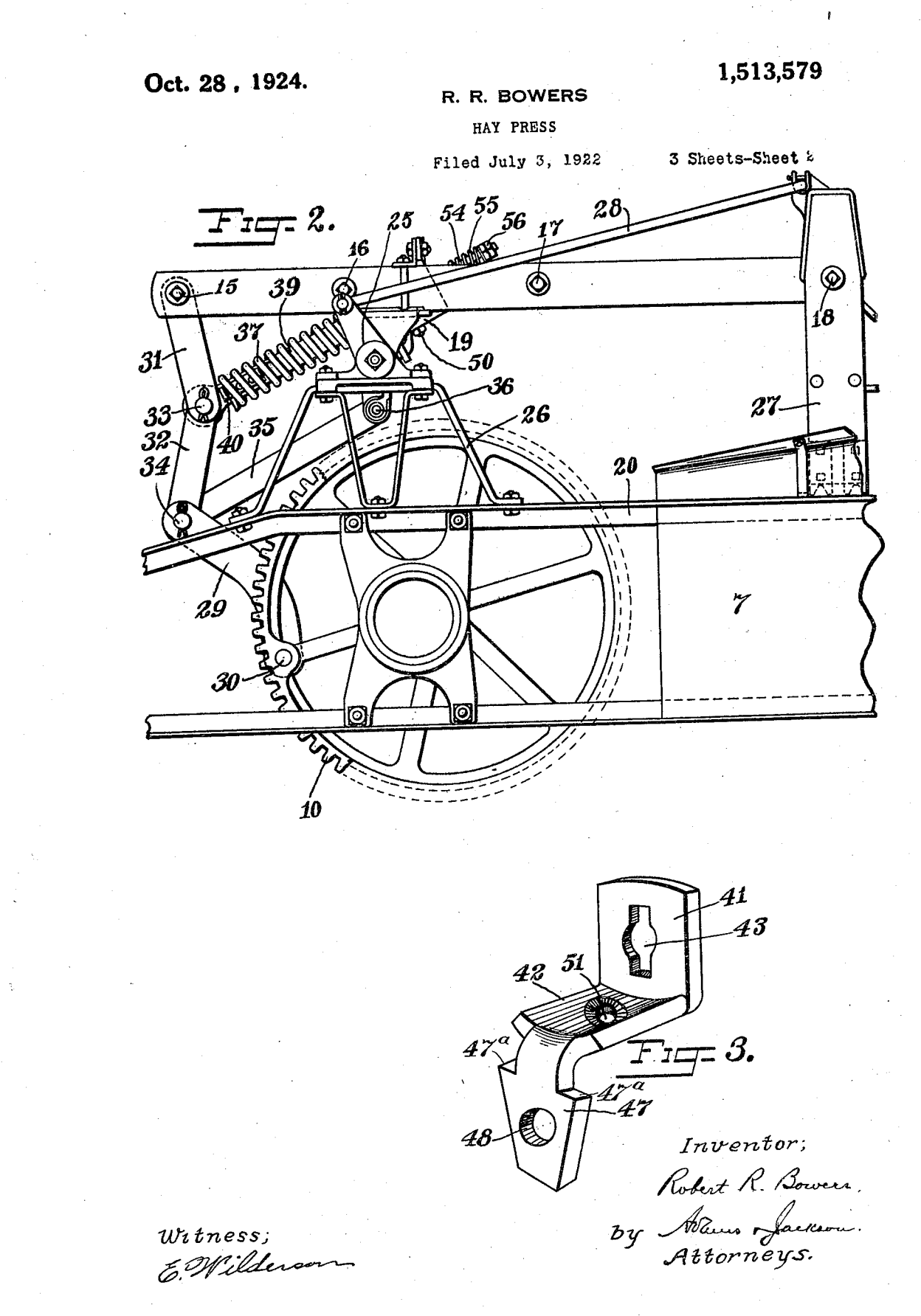

The normal position of the toggle members is that shown in Figs 1 and 2, from an inspection of which it will be seen that they are in approximate but not actual alinement, the pivot 33, which is at the breaking point of the toggle, being somewhat in front of a plane intersecting the bolt 15 and the pivot 34. The toggle, therefore, does not act as a positive lock which prevents the rear end of the feeder arm and the upper end of the operating arm 29 from approaching each other when the press is in operation. I therefore provide means for holding them in their normal position which will be operative under ordinary strains, but which will permit the toggle to break further under extraordinary strains, thereby permitting the feeder arm to yield. For this purpose I provide a compression spring 37 which is interposed between the pivot 33 and a plate 38 which forms a part of the casting 19 as shown in Fig. 4. By this construction it will be apparent that the spring 37 tends to hold the compression member 31 at a pronounced angle to the feeder arm, so that the stress tending to compress the spring is then comparatively light and the proportionate part of the power transmitted to the feeder arm is greatest. When, however, the feeder arm encounters abnormal resistance, the increased end thrust on the spring resulting from the heavier load sustained by the thrust member 31 compresses the spring and permits said thrust member to swing to a more acute angle to the feeder arm, which in turn applies a greater proportionate part of the operating force to the spring because of the more favorable angle at which such force then operates against it, and the less favorable angle through which it operates against the feeder arm. The result is that the stress to which the spring is subjected is increased at a rate relatively greater than that at which the stress sustained by the feeder increases when the feeder head encounters abnormal resistance. In the best embodiment of my invention the spring 37 does not bear directly against the toggle members or against the plate 38, but it is mounted upon a bar 39, the rear end of which is mounted on the pivot 33 while its forward end passes through a suitable slot in the plate 38, as shown in the latter figure. This bar is provided adjacent to its rear end with lugs 40, against which the adjacent end of the spring 37 bears, as shown in Figs. 2 and 4, and the opposite end of said spring bears against a flange 41 carried by a bracket 42 which is adjustably secured to the casting 19 so as to be movable longitudinally of the spring for the purpose of adjusting the normal tension thereof. The flange 41 is provided with a slot 43 conforming generally in size to the cross-sectional dimension of the bar 39, the intermediate portion of said slot being enlarged and rounded for a purpose which will presently be described. The opening in the plate 38 is correspondingly shaped, as shown at 44 in Fig. 6. The bracket 42 is adapted to slide upon the casting 19 which, as shown in Fig. 6 is provided with ribs 45 which are rounded upon their upper surface to conform to the rounded contour of the intermediate portion of the bracket 42, said ribs forming a slideway on which said bracket may move longitudinally with reference to the spring. The space between the ribs 45 constitutes a slot 46 through which passes a tongue 47 depending from the intermediate portion of the bracket 42, as shown in Figs. 3 and 4. This tongue has a hole 48 through which passes an adjusting rod 49, the upper end of which is connected by a bolt 50 with the intermediate portion of the bracket 42, the latter being provided with a bolt hole 51 for the reception of the head of the bolt 50. The opposite end of the rod 49 is screwthreaded and passes through a hole in a boss 52 which forms a part of the casting 19. A nut 53 screwed on the end of the bolt 49 below the boss 52 provides means by which the rod 49, and through it the bracket 42, may be adjusted for the purpose described.

As shown in Fig. 4, the upper or forward end of the bar 39 is provided with a rounded extension 54 upon which is mounted a cushioning spring 55, held in place by a nut 56. The rounded extension 54 is adapted to pass through the rounded portion of the slots 43 and 44, but the spring 55 is of somewhat greater diameter than such rounded portion of the slots and, consequently, it is intercepted by the plate 38 when the bar 39 moves downward, or to the left as viewed in Fig. 4, thereby cushioning the parts of the toggle mechanism when they are restored to their normal position by the action of the spring 37 after the abnormal tension has been relieved.

From the foregoing description it will be understood that under ordinary operating conditions the parts of the feeder mechanism will sustain their relation to each other shown in Fig. 2, at which time the toggle members will be so nearly alined that the tension of the spring 37 will hold them against ordinary resistance encountered by the feeder arm. At this time the inner end of the cushioning spring 54 will bear on the plate 38. If it be desired to vary the normal action of the spring 37, it may be done by adjusting the position of the bracket 42 by turning the nut 53 in one direction or the other upon the rod 49. When the feeder arm encounters extraordinary resistance, its rear end will tend to move toward the operating arm 29, which at that time will be rising under the action of the bull gears 10 rotating in a clockwise direction as viewed in Fig. 2. This, of course, will tend to break the toggle further against the resistance of the spring 37, thereby putting said spring under greater tension and moving the bar 39 longitudinally toward the position shown in Fig. 4. This breaking of the toggle will permit the feeder arm to yield or remain stationary during part of the stroke of the driving gears, and if the obstruction remains the bull gears may continue to rotate without moving the feeder head down beyond the point where resistance is encountered, the above described action of the toggle mechanism being repeated upon each stroke of the driving mechanism. When, however, the obstruction is removed, the spring 37 will operate to restore the members of the toggle to their normal position by moving the bar 39 downward, or to the left as viewed in Fig. 4, this movement being cushioned by the spring 55, the inner end of which is thereby caused to strike the plate 38. It will be apparent that by the interposition of the toggle between the rear end of the feeder arm and the operating arm 29 the release spring 37 operates to greater advantage when the toggle members are in their normal relation to each other than when they break further, and as the breaking of the toggle progresses the leverage of the release spring against the feeder arm becomes proportionately less as the angle between the upper and lower toggle members becomes more acute. The feeder arm, therefore, is not subjected to proportionately increasing strain when the feeder head encounters resistance sufficient to prevent its normal operation, and as the driving mechanism is not subjected to undue resistance in those circumstances, there is no loss of power.

Having now described one form of apparatus in which my invention may be embodied, I wish it to be understood that my invention is not restricted to the specific embodiment thereof illustrated and described, except in so far as the same is particularly claimed, but includes generically the subject matter for broader claims. Furthermore, my improvements may be adapted to other than hay presses, and the claims hereinafter made are therefore to be construed accordingly.

What I claim as my invention and desire to secure by Letters Patent, is—

1. In a press the combination with a feeder and a power operated actuating member, of compression means operatively connecting the feeder and said actuating member and adapted to yield when the feeder encounters abnormal resistance, and a spring for holding said compression means in its normal position, said compression means operating to increase the tension on said spring when the feeder encounters abnormal resistance.

2. In a press the combination with a feeder and a power operated actuating member, of compression means operatively connecting the feeder and said actuating member and adapted to yield when the feeder encounters abnormal resistance, and a spring for holding said compression means in its normal position, said compression means operating to increase the tension on said spring when the feeder encounters abnormal resistance at a rate relatively greater than that at which the stress sustained by the feeder increases.

3. In a press the combination with a feeder and a power operated actuating member, of a pivoted compression member interposed between the feeder and the actuating member for transmitting power to the feeder, and a spring arranged to resist movement of said compression member toward a position of less angularity with relation to the feeder.

4. In a press the combination with a feeder and a power operated actuating member, of a toggle interposed between the feeder and the actuating member for transmitting power to the feeder, and a spring arranged to resist movement of the toggle members toward a position of less angularity with relation to the feeder.

5. The combination with the feeder head of a hay press and power operated means for actuating the same, of a relief spring, and toggle mechanism co-acting with said spring to resist the operating stress sustained by the feeder head, the members of such toggle mechanism being normally in approximate but not actual alinement.

6. The combination with the feeder arm of a hay press and power operated means for actuating the same, of a relief spring, and toggle members pivotally connected together and co-acting with said spring to resist the operating stress sustained by the feeder arm, and to transmit proportionately greater stress to said spring when the feeder arm encounters abnormal resistance.

7. The combination with the feeder arm of a hay press and power operated means for actuating the same, of a relief spring, and toggle members pivotally connected together and interposed between the feeder arm and the actuating means, said toggle members co-acting with said spring to resist the operating stress sustained by the feeder arm.

8. The combination with the feeder arm of a hay press and power operated means for actuating the same, of toggle members pivotally connected together and interposed between the feeder arm and said actuating means, and a relief spring bearing against said toggle members adjacent to their pivotal connection.

9. In a hay press the combination with a feeder arm, a feeder head carried thereby and power operated means for actuating said feeder arm, of means for transmitting power from said actuating means to said feeder arm comprising toggle members normally in approximate but not actual alinement, and yielding means tending to hold said toggle members in their normal position.

10. In a hay press the combination with a feeder arm, a feeder head carried thereby, and power operated means for actuating said feeder arm, of relief mechanism comprising a toggle the members of which are normally in approximate but not actual alinement, and a spring tending to hold said toggle members in their normal position and adapted to yield when the feeder head encounters abnormal resistance.

11. The combination with the feeder head of a hay press and power operated means for actuating the same, of a relief spring, toggle mechanism co-acting with said spring to resist the operating stress sustained by the feeder head, and a cushioning spring operating when the toggle mechanism is restored to its normal position.

12. The combination with the feeder head of a hay press and power operated means for actuating the same, of a relief spring, toggle mechanism co-acting with said spring to resist the operating stress sustained by the feeder head, and means for adjusting said spring to vary the normal position of said toggle mechanism.

13. In a hay press the combination with a feeder arm, an operating arm, power operated means for actuating said operating arm, toggle mechanism interposed between said feeder arm and said operating arm, a rod connected with said toggle mechanism, and a relief spring mounted on said rod and tending to resist movement of said toggle mechanism toward a position of less angularity with relation to said feeder arm.

14. In a hay press the combination with a feeder arm, a pivotal support therefor, an operating arm, power operated means for actuating said operating arm, toggle mechanism interposed between said feeder arm and said operating arm, a rod connected with said toggle mechanism, a relief spring mounted on said rod and tending to hold said toggle mechanism in its normal position, and an adjustable stop mounted on the feeder arm support against which one end of said spring bears.

15. In a hay press the combination with a feeder arm, an operating arm, power operated means for actuating said operating arm, toggle mechanism interposed between said feeder arm and said operating arm, a rod connected with said toggle mechanism, a relief spring mounted on said rod and tending to hold said toggle mechanism in its normal position, and a cushioning spring mounted on said rod.

16. In a hay press the combination with a feeder arm, an operating arm, power operated means for actuating said operating arm, toggle mechanism interposed between said feeder arm and said operating arm, a rod connected with said toggle mechanism, a relief spring mounted on said rod and tending to hold said toggle mechanism in its normal position, and a casting upon which said feeder arm is mounted and through which said rod extends, said casting forming a stop for one end of said spring.

17. In a hay press the combination with a feeder arm, an operating arm, power operated means for actuating said operating arm, toggle mechanism interposed between said feeder arm and said operating arm, a rod connected with said toggle mechanism, a relief spring mounted on said rod and tending to hold said toggle mechanism in its normal position, a casting upon which said feeder arm is mounted and through which said rod extends, and an adjustable bracket mounted on said casting and forming a support for one end of said spring.

18. In a hay press the combination with a feeder arm, an operating arm, power operated means for actuating said operating arm, toggle mechanism interposed between said feeder arm and said operating arm, a rod connected with said toggle mechanism, a relief spring mounted on said rod and tending to hold said toggle mechanism in its normal position, a casting upon which said feeder arm is mounted and through which said rod extends, and a cushioning spring carried by said rod and adapted to bear against said casting.

ROBERT R. BOWERS.